G. Gunther,

Bird Cage.

No. 112,449.   Patented Mar. 7, 1871.

Witnesses:
E. Bilhuber.
E. F. Kastenhuber

Inventor
Gottlob Günther
per
Van Santvoord & Hauff
atty

United States Patent Office.

GOTTLOB GÜNTHER, OF NEW YORK, N. Y.

Letters Patent No. 112,449, dated March 7, 1871.

IMPROVEMENT IN BIRD-CAGES.

The Schedule referred to in these Letters Patent and making part of the same.

*To all whom it may concern:*

Be it known that I, GOTTLOB GÜNTHER, of the city, county, and State of New York, have invented a new and useful Improvement in Bird-Cages; and I do hereby declare the following to be a full, clear, and exact description thereof, which will enable those skilled in the art to make and use the same, reference being had to the accompanying drawing forming part of this specification, in which drawing—

Similar letters indicate corresponding parts.

Figure 1:
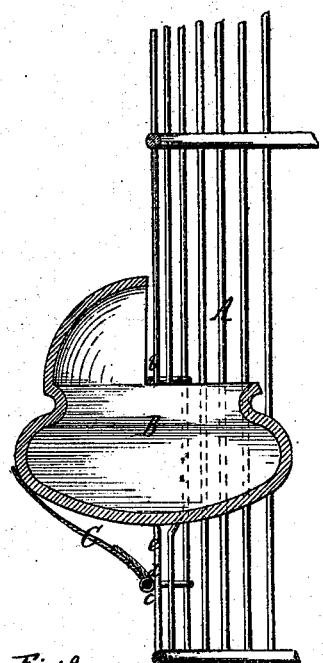
Figure 1 represents a transverse section of this invention.

This invention consists in the arrangement of a spring flap capable of holding the feed-cup in position when the same is attached to the cage, and made of such a shape that it closes the opening left in the bird-cage when the feed cup is removed, thereby preventing the escape of the bird.

In the drawing—

The letter A represents a portion of a bird-cage, which is provided with an opening, $a$, to receive the feed-cup B.

This feed-cup is of that class known technically as half cup, being provided with a partial cover forming an integral part of the cup.

Figure 2:
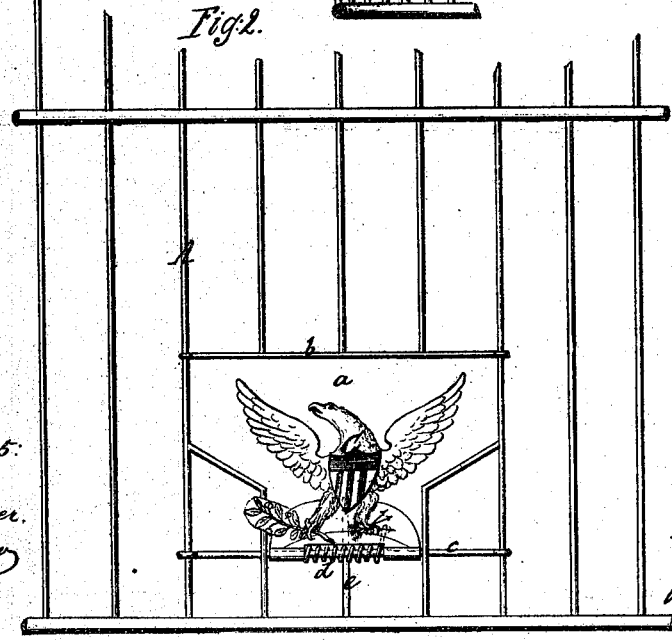
Figure 2 is a front view thereof, when the feed-cup is removed.

The opening $a$ in the side of the cage is bounded at the top by a rod, $b$, and at the bottom by a rod, $c$, and a spring, $d$, is so arranged that it acts on a flap, C, which is hinged to the rod $c$, and which, when allowed to follow the action of the spring $d$, is turned up to the position shown in fig. 2, being retained in this position by a stop, $e$, extending up on the inside of the rod $c$.

The flap C is, by preference, made in the form of an eagle, or other animal, with spread wings; or, in other words, it is made of such a form or shape that the same, when left to follow the action of its spring, is capable of closing the opening $a$ in the cage sufficiently to prevent the escape of the bird when the feed-cup is removed.

When the feed-cup is to be inserted the flap C is turned down, and, after the feed-cup has been introduced in the opening $a$ and the flap is released, said cup is pressed up against the rod $b$ by the action of the flap, as indicated in fig. 1, and by these means it is securely held in position.

By these means the feed-cup can easily be inserted and removed; and when it is removed the opening $a$ is sufficiently closed to prevent the escape of the bird; and furthermore, the spring flap which serves to retain the feed-cup in position is so constructed that the same, when the feed-cup is removed, allows of "nesting" the cages, which is a great convenience and saving in packing and transporting these articles.

I do not wish to confine myself to the precise form or shape of the spring flap shown in the drawing; but

What I claim as new, and desire to secure by Letters Patent, is—

The arrangement, on a bird-cage, of a spring flap, forming an ornament for the cage, and being capable of closing the opening $a$ when the feed-cup is removed, and serving to retain said feed-cup in position when the latter is inserted in the opening $a$, all as herein shown and described.

G. GÜNTHER.

Witnesses:
W. HAUFF,
E. F. KASTENHUBER.